US009880826B2

United States Patent
Alfonso et al.

(10) Patent No.: US 9,880,826 B2
(45) Date of Patent: Jan. 30, 2018

(54) INSTALLING OF APPLICATION RESOURCES IN A MULTI-TENANT PLATFORM-AS-A-SERVICE (PAS) SYSTEM

(71) Applicant: Red Hat, Inc., Raleigh, NC (US)

(72) Inventors: Chris Alfonso, Raleigh, NC (US); Luke Meyer, Cary, NC (US); Clayton Coleman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 31 days.

(21) Appl. No.: 14/189,038

(22) Filed: Feb. 25, 2014

(65) Prior Publication Data

US 2015/0242197 A1 Aug. 27, 2015

(51) Int. Cl.
| | |
|---|---|
| *G06F 9/445* | (2006.01) |
| *G06F 9/455* | (2006.01) |
| *G06F 11/14* | (2006.01) |
| *G06F 9/44* | (2006.01) |
| *H04L 29/08* | (2006.01) |

(52) U.S. Cl.
CPC ............ *G06F 8/65* (2013.01); *G06F 9/45558* (2013.01); *G06F 8/60* (2013.01); *G06F 8/61* (2013.01); *G06F 9/4401* (2013.01); *G06F 11/1417* (2013.01); *G06F 2009/45562* (2013.01); *H04L 67/10* (2013.01)

(58) Field of Classification Search
CPC . G06F 8/65; G06F 8/60; G06F 15/177; G06F 8/61; G06F 9/4401; G06F 11/1417; H04L 67/10
See application file for complete search history.

(56) References Cited

U.S. PATENT DOCUMENTS

| | | | |
|---|---|---|---|
| 8,719,415 B1* | 5/2014 | Sirota | H04L 67/10 709/221 |
| 2008/0127171 A1* | 5/2008 | Tarassov | G06F 8/60 717/174 |
| 2012/0054410 A1* | 3/2012 | Vaghani | G06F 3/064 711/6 |

(Continued)

OTHER PUBLICATIONS

Anonymous, Method and apparatus for event-driven software distribution in a cloud-computing infrastructure, Jul. 19, 2011, pp. 13.*

(Continued)

*Primary Examiner* — Hanh T Bui
(74) *Attorney, Agent, or Firm* — Lowenstein Sandler LLP

(57) ABSTRACT

A mechanism for automatic installing and scaling of application resources in a multi-tenant Platform-as-a-Service (PaaS) environment in a cloud computing system is disclosed. A method includes creating, by a processing device of an Infrastructure-as-a-Service (IaaS) platform, an image package corresponding to a node host on a multi-tenant Platform-as-a-Service (PaaS) system. The image package comprises an image file including a script file having a plurality of software updates and run time configuration files. The image package is stored in a storage memory of the IaaS platform and is accessible by a virtual machine (VM) instance. The method also includes retrieving, from the storage memory, the script file from the image package and causing a boot process of the VM instance to download the script file into the PaaS system.

17 Claims, 5 Drawing Sheets

(56) References Cited

U.S. PATENT DOCUMENTS

| | | | | |
|---|---|---|---|---|
| 2012/0266168 A1* | 10/2012 | Spivak | .................... | H04L 67/10 |
| | | | | 718/1 |
| 2014/0068611 A1* | 3/2014 | McGrath | ............. | G06F 9/45533 |
| | | | | 718/1 |
| 2014/0280433 A1* | 9/2014 | Messerli | ................. | H04L 67/10 |
| | | | | 709/201 |
| 2015/0120815 A1* | 4/2015 | Higuchi | .................. | H04L 67/10 |
| | | | | 709/203 |

OTHER PUBLICATIONS

Tim Ward, Tim Ward's Blog, Mounting Virtual Machine Disk Images, Jun. 26, 2008, retrieved online on Dec. 8, 2015. Retrieved from the Internet: <URL: http://timhward.blogspot.com/2008/06/mounting-virtual-machine-disk-images.html>.*

IBM, Method and apparatus for automated configuration and deployment of multi-tenant software applications, Apr. 14, 2009, retrieved online on Apr. 15, 2016. Retrieved from the Internet: <URL: http://priorart.ip.com/IPCOM/000181812>.*

Steffen Kachele and Franz J. Hauck, Component-based Scalability for Cloud Applications, ACM, 2013, retrieved online on Sep. 18, 2017, pp. 19-24. Retrieved from the Internet: <URL: http://delivery.acm.org/10.1145/2470000/2460760/p19-kachele.pdf?>.*

Tania Lorido-Botran, A Review of Auto-scaling Techniques for Elastic Applications in Cloud Environments, ResearchGate, Journal of Grid Computing, Dec. 2014, retrieved online on Sep. 18, 2017, pp. 1-26. Retrieved from the Internet: <URL: https://www.researchgate.net/profile/Tania_Lorido-Botran/publication/265611546_A_Review_of_Auto-scaling_Techniques_f>.*

* cited by examiner

INSTALLING OF APPLICATION RESOURCES IN A MULTI-TENANT PLATFORM-AS-A-SERVICE (PAS) SYSTEM

TECHNICAL FIELD

The embodiments of the invention relate generally to platform-as-a-service (PaaS) environments and, more specifically, relate to automatic installing and scaling of application resources in a multi-tenant PaaS system.

BACKGROUND

Currently, a variety of Platform-as-a-Service (PaaS) offerings exists that include software and/or hardware facilities for facilitating the execution of applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework.

PaaS offerings typically facilitate deployment of application resources without the cost and complexity of buying and managing the underlying hardware and software and provisioning hosting capabilities, providing the facilities to support the complete life cycle of building and delivering applications. Typically, these facilities operate as one or more virtual machines (VMs) running on top of a hypervisor in a host server.

Most application resources utilize multiple layers of functionality to operate. Components within each of these layers may have their own resource requirements, dependencies, and so forth. Additionally, these components may operate on a single machine or may operate on different machines. As load on the application resources changes, it may be desirable to increase or decrease scale of the application resources. This may include utilizing additional application resources that host additional instances of the one or more of the layers or keeping such application resources available even when they are not needed. Also, when these machines are at capacity in terms of hosted application resources, additional application resources cannot be created until a PaaS operator provisions another application resource. The management of such scaling of PaaS resources can be quite complex, and is performed manually by a network administrator.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for automatic installing and scaling of application resources in a multi-tenant Platform-as-a Service (PaaS) system. A method of embodiments of the invention includes integrating an Infrastructure-as-a-Service (IaaS) platform into the multi-tenant PaaS environment. The IaaS platform manages and orchestrates the infrastructure for deployed applications, provisions resources, creates and allocates virtual machines (VMs), and installs an operating system image on the VMs. The multi-tenant PaaS system is a platform that allows users to launch software applications in a cloud computing environment. A VM is a software implementation of a computing environment on which an operating system (OS) or a program can be installed and run. Prior solutions for scaling application resources on the multi-tenant PaaS system include adding additional application resources that host additional instances of one or more of layers or keeping such resources active and available (e.g. "online") even when they are not needed. When the machines are running at capacity of hosted application resources, additional application resources cannot be created until a PaaS operator manually provisions another application resource. Embodiments of the present disclosure overcome these disadvantages by automating the installing and scaling of application resources, such as machines (e.g., VMs) hosting the applications, in the PaaS system without any intervention from the PaaS operator, which minimizes the time to scale the application resources.

Embodiments of the invention provide a mechanism for automatic installing and scaling of application resources in a multi-tenant PaaS system. A method of the embodiments includes creating by an Infrastructure-as-a-Service (IaaS) platform, an image package corresponding to a node host on a multi-tenant Platform-as-a-Service (PaaS) system. The image package comprises a script file including a plurality of software updates and run time configuration files. The image package is stored in a storage memory of the IaaS platform and is accessible by a VM instance. The method also includes retrieving, from the storage memory, the script file from the image package and causing a boot process of the VM instance to download the script file into the PaaS system.

Figure 1:
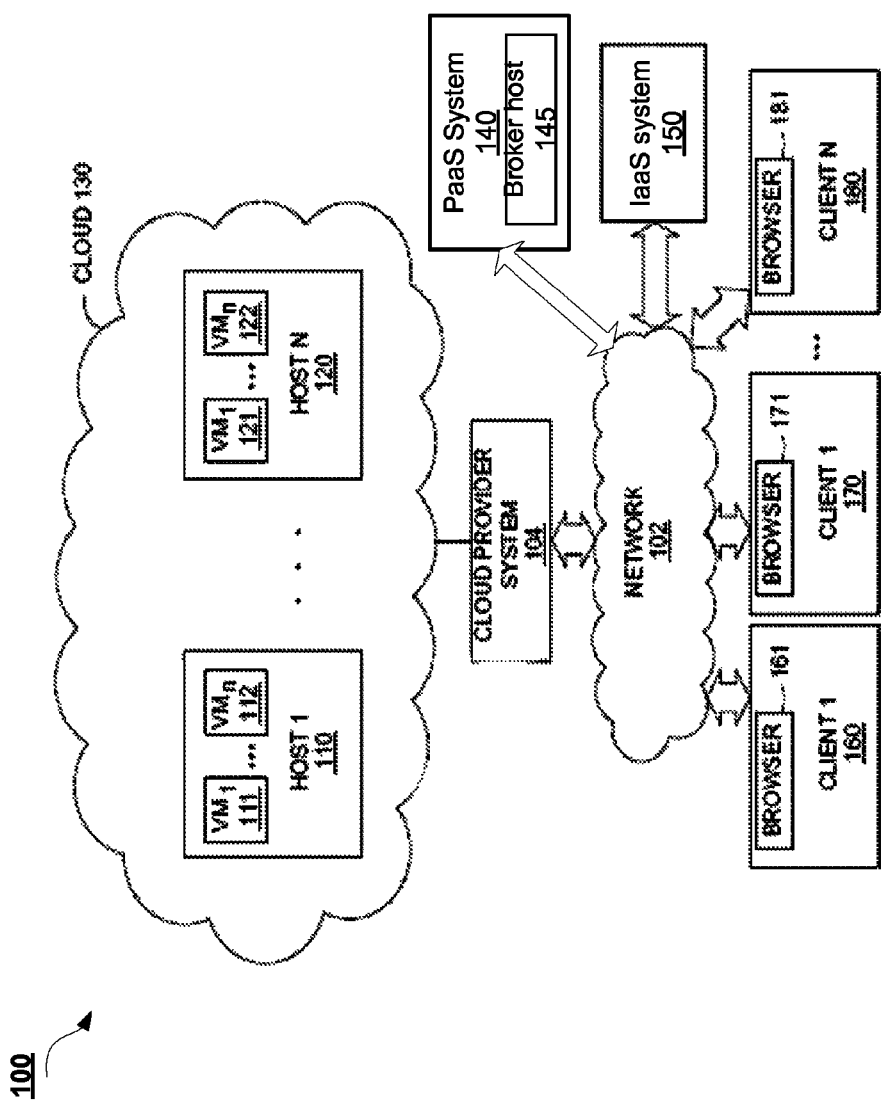
FIG. 1 is a block diagram of a network architecture in which embodiments of the invention may operate.

FIG. 1 is a block diagram of a network architecture 100 in which embodiments of the invention may operate. The network architecture 100 includes a cloud 130 managed by a cloud provider system 104. The cloud provider system 104 provides VMs, such as VMs 111, 112, 121, and 122 hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to an IaaS platform 150 via the network 102. In one embodiment, the IaaS platform 150 enables automatic installing and scaling of application resources in a multi-tenant PaaS system 140 implemented in the cloud 130. The application resources may include a node host in the PaaS system 140. In one embodiment, the IaaS platform 150 manages and orchestrates the infrastructure for the application resources of the multi-tenant PaaS system, including, but not limited to, creating and allocating the application resources, provisioning the application resources, and installing operating system images on the VMs. In one embodiment, the multi-tenant PaaS system 140 is a platform that allows users to launch software applications in a cloud computing environment, such as cloud computing environment provided in the network architecture 100.

In one embodiment, the IaaS platform 150 provides image packages associated with different application resources to the PaaS system 140. As will be discussed in more detail below, an image package includes an image file that has pre-installed packages to run a VM or a physical system. In one embodiment, the IaaS platform 150 stores the image package. In one embodiment, the IaaS platform 150 installs the application resources using the image packages.

In one embodiment, a broker host 145 for the PaaS system 140 includes a component to monitor runtime behavior of nodes (e.g., VMs 111, 112, 121, 122) of the PaaS system 140. The broker host 145 may determine, for example, load on the nodes 111, 112, 121, 122 of the PaaS system 140. The broker host 145 may send a message to the IaaS platform 150 to increase the scale of the nodes of the PaaS system 140. A broker host may provide an interface where clients can manage their hosted applications. The broker may also provide for an orchestration of nodes. A node may store and serve the hosted applications.

In one embodiment, the IaaS platform 150 may increase the scale of the nodes 111, 112, 121, 122 by allocating a new node for the PaaS system 140. A new node may include a new host and/or a new VM running on a new or existing host. The IaaS platform 150 may then inform the PaaS system 140 of the new node. The PaaS system 140 then integrates the new node into an existing cluster (weaves the new node into the PaaS) via the broker host 145. In one embodiment, the broker host 145 of the PaaS system 140 may decrease the scale of the nodes by de-allocating an existing node.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
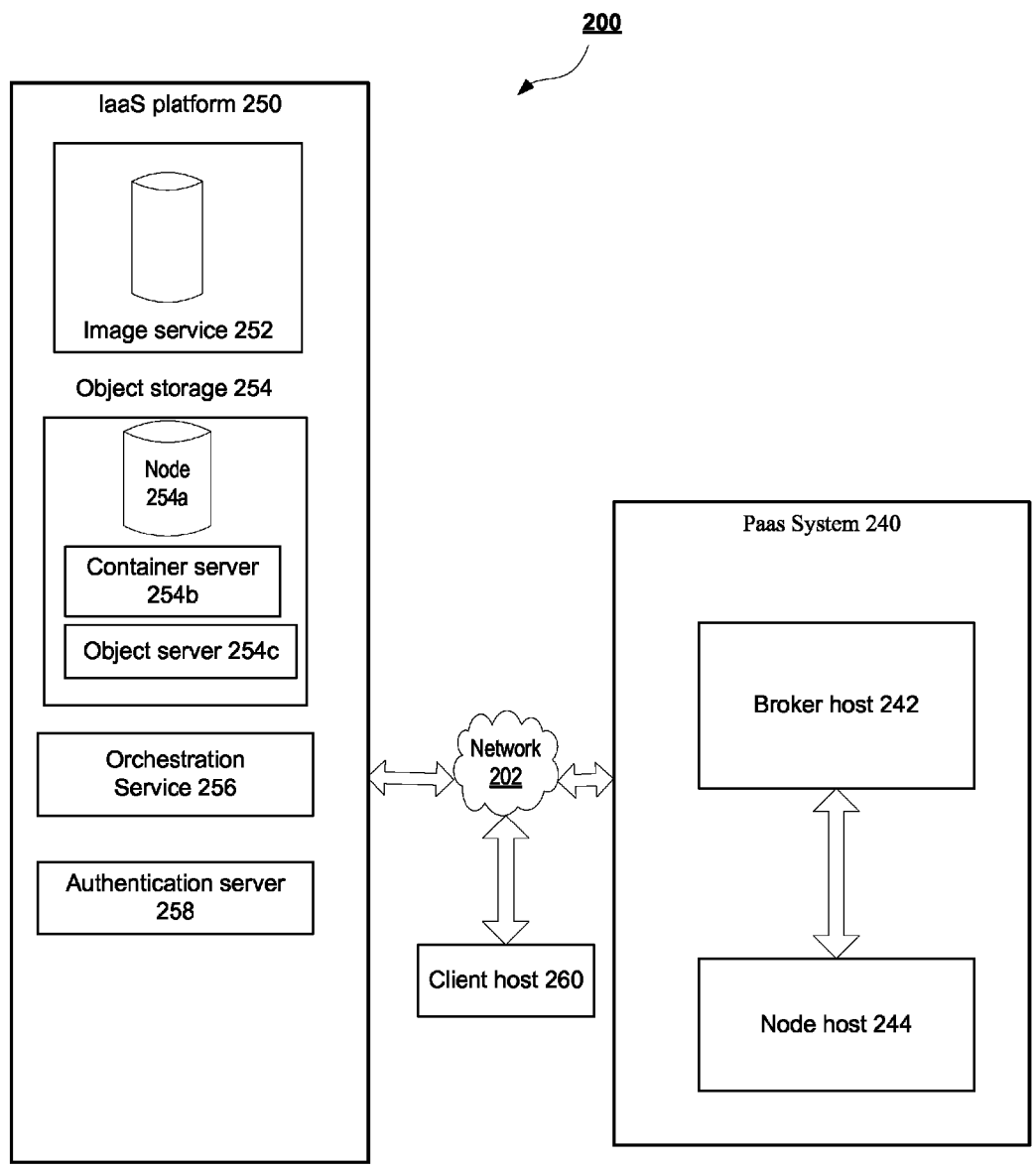
FIG. 2 is a block diagram of a multi-tenant Platform-as-a-Service (PaaS) system in communication with a Infrastructure-as-a-Service (IaaS) system according to an embodiment of the invention.

FIG. 2 is a block diagram of a network architecture 200 including a PaaS system 240, coupled to an IaaS platform 250 via a network 202 in accordance with embodiments of the disclosure. In one embodiment, the PaaS system 240 is same as the PaaS system 140, the IaaS 250 is same as the IaaS platform 150, and the network 202 is same as the network 102 respectively, as described with respect to FIG. 1.

As discussed above, the PaaS system 240 allows users to launch software applications in an environment, such as cloud computing environment provided in network architecture 100 described with respect to FIG. 1. The PaaS system 240, in one embodiment, includes a broker host 242 and a node host 244. A client host 260 communicates with the PaaS system 240 via the network 202.

In one embodiment, the client host 260 resides on a client machine, such as a workstation of a software developer, and provides an interface to a user of the client machine to a broker host 242 of the PaaS system 240. For example, the broker host 242 may facilitate the creation and deployment, via node host 244, of software applications being developed by the user at client host 260.

In one embodiment, the broker host 242 acts as managing agent between the client host 260 and the node host 244. The node host 244 includes nodes on which software applications are provisioned and executed. In one embodiment, each node is a VM provisioned by an IaaS provider. In other embodiments, the nodes may be physical machines or VMs residing on a single physical machine. In one embodiment, the broker host 242 is implemented on one or more machines, such as server computers, desktop computers, etc. In some embodiments, the broker host 242 may be implemented on one or more machines separate from machines implementing each of the client host 260 and the node host 244, or may implemented together with the client host 260 and/or the node host 244 on one or more machines, or some combination of the above.

In one embodiment, the IaaS platform 250 comprises an image service 252, an object storage service 254, an orchestration service 256 and an authentication server 258. While FIG. 2 illustrates each of the above-listed services running on a dedicated hardware server, in certain implementations, two or more of those services may be collocated on a single hardware server. Servers executing the above-listed services may be interconnected by one or more networks 202, including one or more local area networks, one or more wide area networks, or any combination thereof.

In one embodiment, the object storage service 254 provides a multi-tenant object storage system for large amounts of unstructured data. In certain implementations, object storage service 254 may implement a REST-compliant application programming interface (API). In an illustrative example, HTTP protocol may be used as the transport layer for the API. In an illustrative example, object storage service 254 may comprise one or more storage nodes 254a, one or more container servers 254b to manage mappings of object containers, one or more object servers 254c to manage objects (such as files) on the storage nodes, and one or more authentication servers 258 to manage accounts defined within the object storage service.

In one embodiment, the IaaS platform 250 stores the image package. In one embodiment, the IaaS platform 250 installs the application resources using the image packages. In one embodiment, the application resource is a node host of the PaaS system. In one embodiment, the node host is the VM. As discussed above, an image package includes an image file that has pre-installed packages to run a VM or a physical system. In one embodiment, the image package is modified to customize the VM for the application resource. The image package may be modified to include elements associated with configurations and settings of the application resources. As such, the image package includes a script file including a plurality of software updates and a plurality of runtime configuration files (e.g., in the form of executable script files or other binary applications executable by a VM instance bootstrap process). In one embodiment, the script file includes parameters indicating that the script file is to configure the VM as a node host and the script file is downloaded as a node host in the PaaS system. In one embodiment, the parameters may vary based on type of the node hosts.

In one embodiment, the image package is registered with the node host 244 in the PaaS system 240. As such, the registered node image package includes the script file including the software updates and the runtime configuration files for the configurations and settings of the node host 244 in the PaaS system 240. In one embodiment, the software updates and the runtime configuration files may vary based on the type of the node hosts. The registered node image package may be retrieved for installation of the node host 244 in the PaaS system 240. The registered node image package may be retrieved for scaling of the node host 244 in the PaaS system 240.

The image service 252 may include a REST-compliant API that allows users to query the image metadata and retrieve images via HTTP requests. The image package made available through the image service 252 may be stored in a variety of locations, including the object storage service 254, various file systems, HTTP access to remote Internet locations, and/or block devices.

In one embodiment, the orchestration service 256 is used to install the node host 244. The orchestration service 256 may retrieve the registered node image package to download the script file into the PaaS system 240 as described herein below. As discussed above, the parameters in the script file indicating that the script file is downloaded and/or installed as a node host in the PaaS system 240.

The orchestration service 256 may implement loading script files into images of VM instances described herein. In one embodiment, the VM instance runs an operating system with the script file having the software installed and configured to manage all services that enable the PaaS system 240. For every instance to be built, orchestration service 256 may retrieve script file from the image package to be injected into the instance. As, as discussed above, the image package may be a registered node image package. The runtime script file may specify its target location (e.g., the full file system path and the filename) within the VM instance, so that a VM instance bootstrap process would be able to reference the script file after the script file has been successfully injected into the VM instance. In one embodiment, the VM instance bootstrap process is an installation process, which applies the script file including the software updates as well as runtime configuration specific to a single VM during start up. In one embodiment, the file target location is the PaaS system 240.

In one embodiment, the script file references a location from which the file may be retrieved. In one embodiment, the file retrieval location may be specified, e.g., by an object identifier in object storage service 112. In another embodiment, the file retrieval location may be specified by a network file system (NFS) path and file name, assuming that the referenced NFS volume would be mounted by the VM instance bootstrap process before accessing the NFS location.

The orchestration service 256 may combine VM, networking elements, and other cloud resources into a running stack. In one embodiment, the VM instance of a node host 244 is created by the orchestration service 256 and instantiated on the node host 244 of the PaaS system 240. The IaaS platform 250 may provide command line-based, HTTP-based and/or API-based instance management.

The orchestration service 258 may communicate the script file to the VM instance, thus causing the VM instance bootstrap process to download the script file into the PaaS system 240 within the VM instance. The VM instance bootstrap process may process an element by downloading the script file and placing the script file into PaaS system 240. After the script file has been successfully downloaded and placed into the PaaS system 240, the VM instance bootstrap process may use the downloaded files, e.g., by executing runtime agent scripts and/or retrieving configuration data from the downloaded files.

In another embodiment, the orchestration service 258 is employed for automatically enabling scaling of the application resources.

As discussed above, as the number of users accessing applications running on hosts changes, the load on the applications change. If the load becomes too high, then a delay may be introduced for some clients. Additionally, if the load becomes low, then some hosts may run in an idle state, thereby wasting resources.

In one embodiment, the broker host 242 includes a component to monitor runtime behavior of the node host 244. The broker host 242 may determine, for example, load on the node host 244 using one or multiple monitored metrics services executed on the broker host. The broker host 242 may utilize the monitored metrics service to gather information written into a software library of the broker host 242. The information includes capacity metrics from all the node hosts 244 and describes the utilization statistics of the service, which is interpreted to make a decision whether to increase the scale of the node hosts 244, decrease the scale of the node hosts 244 or not make any changes in the scale of the node hosts 244. The broker host 242 may inform the IaaS platform 250 to increase the scale (e.g., number of node hosts operating on the PaaS system 240) of the node host 244. In one embodiment, the broker host 242 may poll the IaaS platform 250 to check whether to increase the scale of the node host 244 operating on the PaaS system 240. As such, the broker host 242 may determine whether a new node for the PaaS system 240 is available in the IaaS system 250. The IaaS platform 250 may increase the scale of the node host 244 by allocating a new node for the PaaS system 240. In one embodiment, the orchestration service 256 of the IaaS platform 250 is used to install the new node into the PaaS system 240 as described above. The IaaS platform 150 may then inform the PaaS system 240 of the new node. The PaaS system 240 then integrates the new node into an existing cluster (e.g., weaves the new node into the PaaS) via the broker host 242. A new node may include a new host and/or a new VM running on a new or existing host.

In one embodiment, the broker host 242 may scale down the node host 244 by de-allocating an existing node. The broker host 242 may remove all the applications currently running on the existing node and migrate them to another node in the PaaS system 240. The broker host 242 may mark the existing node as inactive so no new applications are placed on the existing node. Once the node is no longer hosting any application, broker host 242 may then de-allocate the node from the PaaS system 240.

Figure 3:
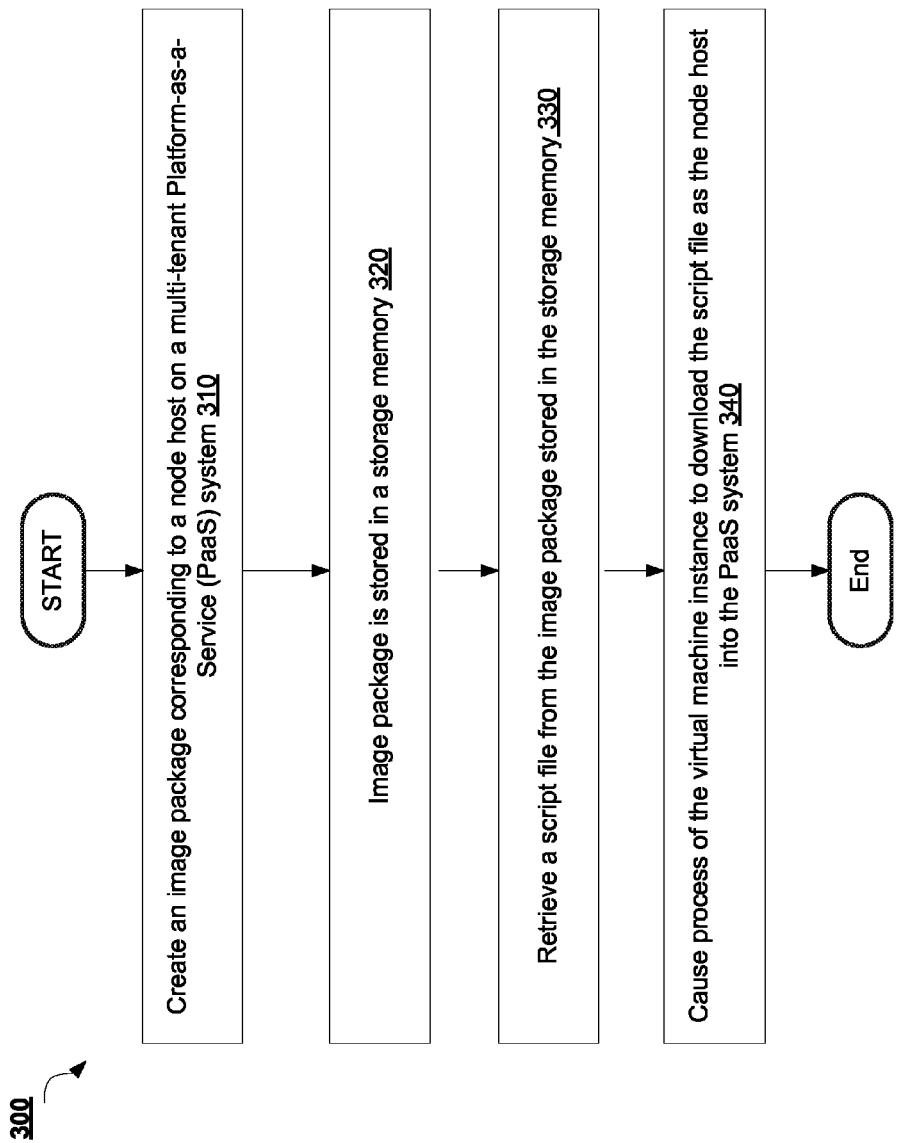
FIG. 3 is a flow diagram illustrating a method for installing an application resource in a multi-tenant PaaS system using the IaaS system according to an embodiment of the invention.

FIG. 3 is a flow diagram illustrating a method 300 performed by IaaS platforms 150 and 250 of FIGS. 1 and 2 respectively, for installing an application resource (i.e. node host 244) in a multi-tenant PaaS system 140 and 240 of FIGS. 1 and 2 respectively, according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the orchestration service 258 executing on the IaaS platform as described with respect to FIG. 2.

The method 300 begins at block 310 where an image package corresponding to a node host on a multi-tenant PaaS system is created. As discussed above, the image package includes a script file including a plurality of software updates and a plurality of runtime configuration files to run the node host in the multi-tenant PaaS system. In one embodiment, the node host is the VM. In one embodiment, the image package includes a registered node host image package that is associated with the VM of the node host.

At block 320, the image package is stored in a storage memory. In one embodiment, the storage memory is the object storage 254 of FIG. 2. The image package is accessible by a VM instance. At block 330, a script file from the image package is retrieved from the storage memory. At block 340, the boot process of the VM instance (i.e. the VM instance bootstrap process) is caused to download the script file as a node into the PaaS system. When a VM is started up for the first time, the VM instance bootstrap process runs the script file, which downloads the software updates and the configurations to be installed on the VM. In one embodiment, VM instance bootstrap process references the script file injected into the VM instance. As discussed above, the parameters in the script file indicate to install a node in the PaaS system. As such, script file configures the VM as a node host and the script file is downloaded as a node host in the PaaS system.

Figure 4:
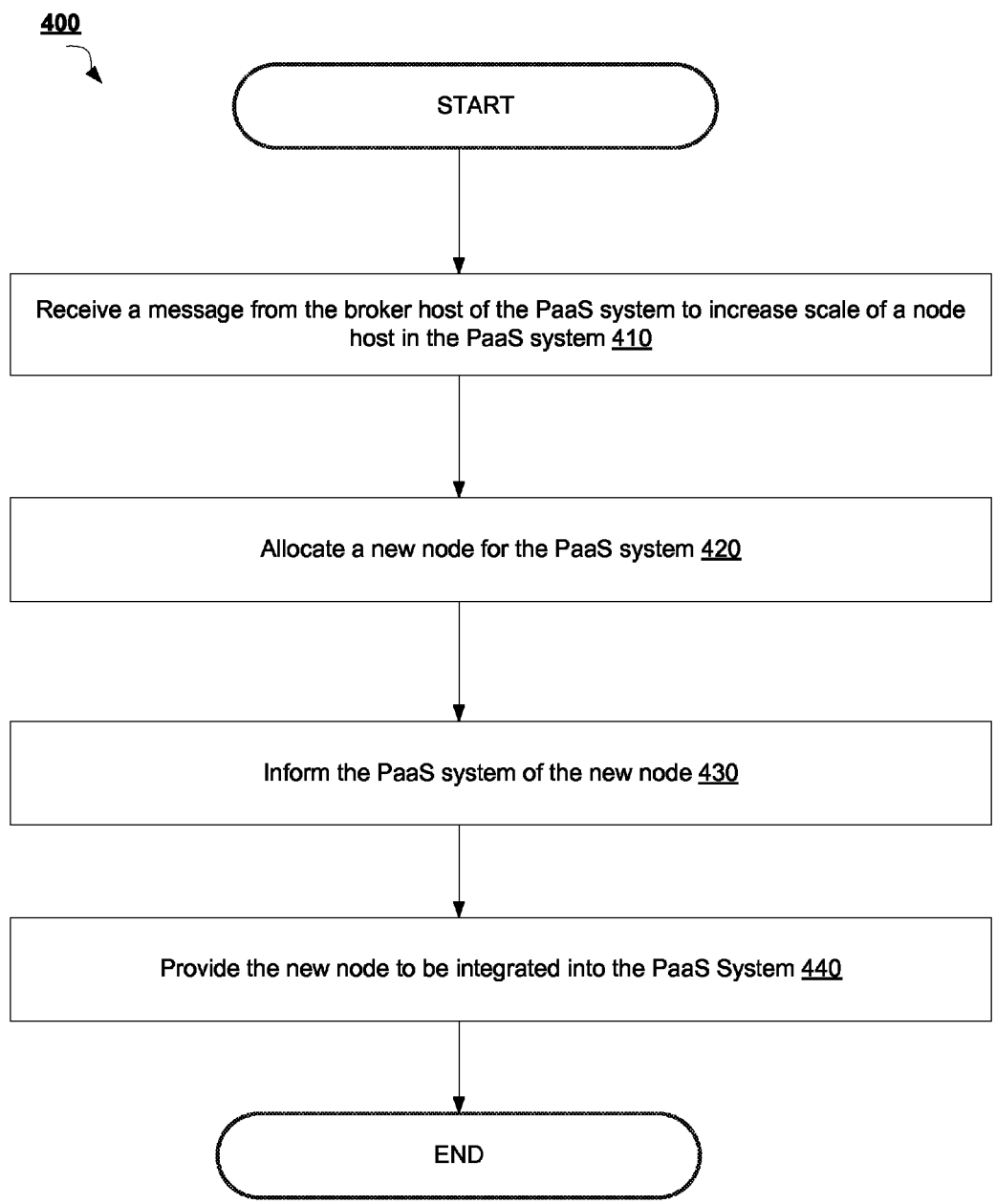
FIG. 4 is a flow diagram illustrating a method for increasing scale of a node host in a multi-tenant PaaS system according to an embodiment of the invention.

FIG. 4 illustrates a flow diagram illustrating a method 400 performed by IaaS platforms 150 and 250 of FIGS. 1 and 2 respectively, for increasing a scale of a node host in a multi-tenant PaaS system 140, 240 of FIGS. 1 and 2 respectively, according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the orchestration service 258 executing on the IaaS platform 250 as described with respect to FIG. 2.

The method 400 begins at block 410 where a message is received from the broker host of the PaaS system to increase a scale of a node host in the PaaS system. In one embodiment, the broker host polls the IaaS platform to check whether to increase the scale of the node host operating on the PaaS system. At block 420, a new node is allocated for the PaaS system. At block 430, the PaaS system is informed of the new node. Specifically, the broker host of the PaaS system is informed of the new node. In one embodiment, the broker host polls the IaaS system of the new node. At block 440, the new node is provided to be integrated into the PaaS system. In one embodiment, the new node is integrated (weaves the new node into the PaaS) in the PaaS system via the broker host. As discussed above, a new node may include a new host and/or a new VM running on a new or existing host. In one embodiment, the orchestration service 256 of the IaaS platform 250 installs the new node into the PaaS system 240 as described above with respect to FIGS. 2 and 3.

Figure 5:
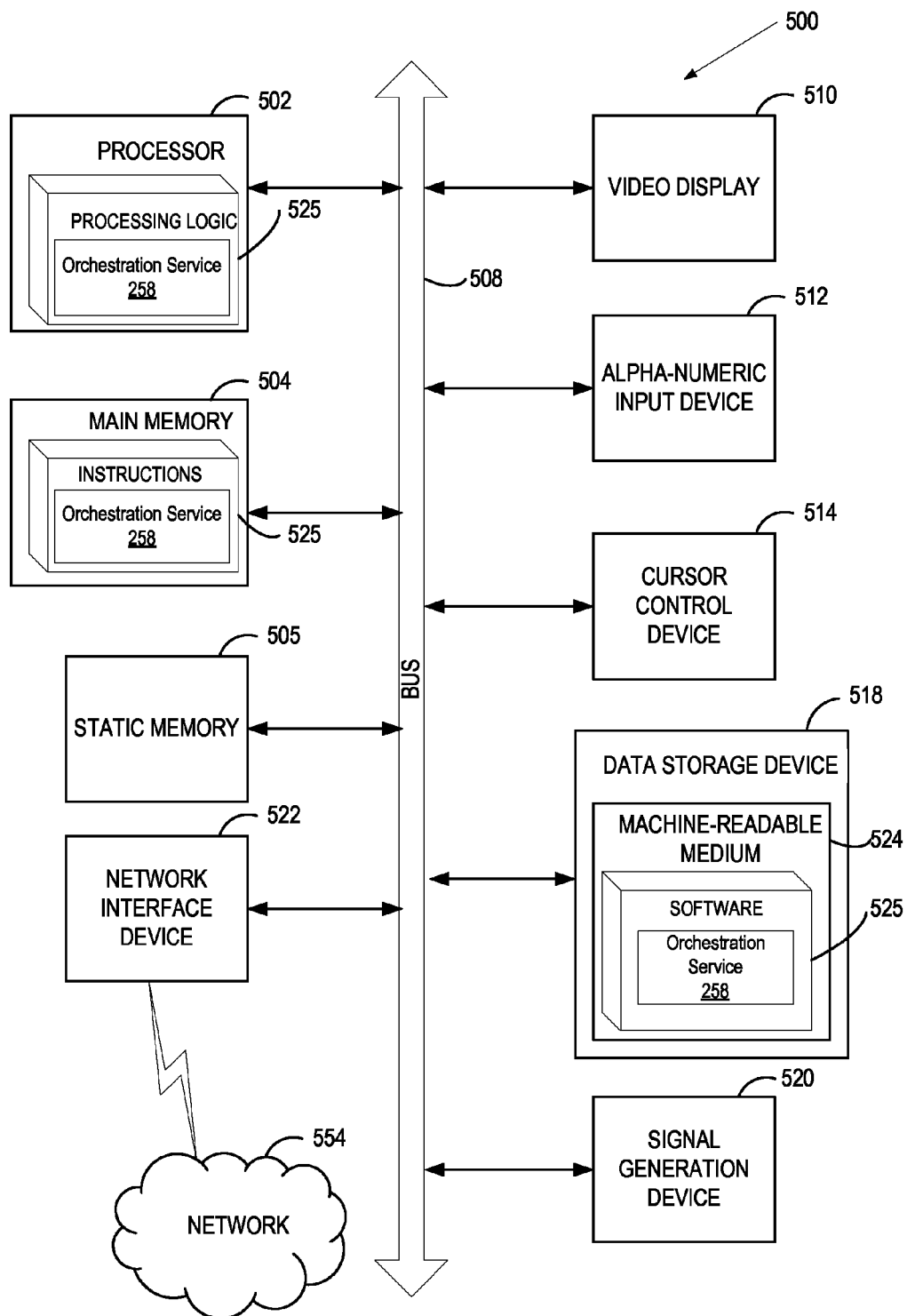
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement an orchestration service to perform installing and scaling of the applications in a multi-tenant PaaS system, such as the orchestration service 256 described with respect to FIG. 2, and/or a software library containing methods that call the above applications. While the machine-accessible storage medium 624 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as, "creating", "causing", "retrieving", "storing", "monitoring", "installing", "downloading", "allocating", "deallocating", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
receiving, by a processing device of an Infrastructure-as-a-Service (IaaS) platform, a first message to increase a load of a first node host on a multi-tenant Platform-as-a-Service (PaaS) system, wherein the first node host comprises a plurality of first nodes;
responsive to receiving the first message, creating, by the processing device, an image package corresponding to the first node host, wherein the image package comprises a script file having a plurality of software updates and run time configuration files to run the first node host;
retrieving, by the processing device, the script file from the image package;
causing, by the processing device, a boot process of a virtual machine (VM) instance to download the script file as a node installed in the PaaS system, wherein the node comprises one of a first node in the plurality of first nodes on the first node host or a second node host, wherein the second node host comprises a plurality of second nodes different from the plurality of first nodes on the first node host; and
allocating, by the processing device, at least one node of the second node host for the PaaS system in view of the first message.

2. The method of claim 1, wherein the script file comprises parameters indicating to download the second node host in the PaaS system.

3. The method of claim 1, wherein the first node host comprises the VM.

4. The method of claim 1, wherein the PaaS system comprises a broker host.

5. The method of claim 4, further comprising receiving a second message from the broker host to decrease the load of the first node host in the PaaS system.

6. The method of claim 4, wherein the broker host polls the IaaS platform to check whether a new node is to be added into the PaaS system.

7. The method of claim 1, wherein the second node host comprises the VM.

8. The method of claim 5, further comprising:
in response to the receipt of the second message, determining whether the first node is hosting an application; and
de-allocating the first node in the first node host in response to determining that the first node is not hosting an application.

9. A system, comprising:
a memory;
a processing device, of an Infrastructure-as-a-Service (IaaS) platform, operatively coupled to the memory to:
receive a first message to increase a load of a first node host on a multi-tenant Platform-as-a-Service (PaaS) system, wherein the first node host comprises a plurality of first nodes;
responsive to receiving the first message, create an image package corresponding to the first node host on a multi-tenant Platform-as-a-Service (PaaS) system, wherein the image package comprises a script file having a plurality of software updates and run time configuration files to run the first node host;
retrieve the script file from the image package;
cause a boot process of a virtual machine (VM) instance to download the script file as a node installed in the PaaS system, wherein the node comprises one of a first node in the plurality of first nodes on the first node host or a second node host, wherein the second node host comprises a plurality of second nodes different from the plurality of first nodes on the first node host; and
allocate at least one node of the second node host for the PaaS system in view of the first message.

10. The system of claim 9, wherein the PaaS system comprises a broker host.

11. The system of claim 10, wherein the processing device receives a second message from the broker host to decrease the load of the first node host in the PaaS system.

12. The system of claim 10 wherein, the broker host polls the IaaS platform to check whether a new node host is to be added into the PaaS system.

13. The system of claim 11 wherein the processing device to:
in response to the receipt of the second message, determine whether the first node is hosting an application; and
de-allocate the first node in the first node host in response to determining that the first node is not hosting an application.

14. A non-transitory machine-readable storage medium including data that, when accessed by a processing device, cause the processing device to:
receive, by the processing device, a first message to increase a load of a first node host on a multi-tenant Platform-as-a-Service (PaaS) system, wherein the first node host comprises a plurality of first nodes;
responsive to receiving the first message, create, by the processing device, an image package corresponding to the first node host, wherein the image package comprises a script file having a plurality of software updates and run time configuration files to run the first node host;
retrieve, the script file from the image package;
cause, by the processing device, a boot process of a virtual machine (VM) instance to download the script file as a node installed in the PaaS system, wherein the node comprises one of a first node in the plurality of first nodes on the first node host or a second node host, wherein the second node host comprises a plurality of second nodes different from the plurality of first nodes on the first node host,
allocate at least one node of the second node host for the PaaS system in view of the first message.

15. The non-transitory machine-readable storage medium of claim 14, wherein the PaaS system comprises a broker host.

16. The non-transitory machine-readable storage medium of claim 15, wherein the processing device is further to receive a second message from the broker host decrease the load of the first node host in the PaaS system.

17. The non-transitory machine readable storage medium of claim 15, wherein the broker host polls the IaaS platform to check whether a new node host is to be added into the PaaS system.

* * * * *